US006704212B2

(12) United States Patent
Furukawa et al.

(10) Patent No.: US 6,704,212 B2
(45) Date of Patent: Mar. 9, 2004

(54) PWM INVERTER WITH LONG CARRIER WAVE INSERTION

(75) Inventors: Teiichi Furukawa, Narashino (JP); Masahiro Hiraga, Yotsukaido (JP); Hiroyuki Tomita, Funabashi (JP); Seiji Ishida, Hitachi (JP); Toshiaki Okuyama, Naka (JP)

(73) Assignees: Hitachi, Ltd., Tokyo (JP); Hitachi Keiyo Engineering & System, Ltd., Chiba (JP)

( * ) Notice: Subject to any disclaimer, the term of this patent is extended or adjusted under 35 U.S.C. 154(b) by 0 days.

(21) Appl. No.: 10/222,048

(22) Filed: Aug. 16, 2002

(65) Prior Publication Data

US 2003/0142517 A1 Jul. 31, 2003

(30) Foreign Application Priority Data

Jan. 30, 2002 (JP) .................................. 2002-020883

(51) Int. Cl.[7] .............................................. H02M 1/12
(52) U.S. Cl. ........................................ 363/41; 363/98
(58) Field of Search ............................ 363/41, 95, 98

(56) References Cited

U.S. PATENT DOCUMENTS

| 4,772,996 A | * | 9/1988 | Hanei et al. .................. 363/41 |
| 5,068,777 A | * | 11/1991 | Ito ................................. 363/97 |
| 5,166,870 A | * | 11/1992 | Shimizu et al. ............... 363/98 |
| 5,436,819 A | * | 7/1995 | Mikami et al. ................ 363/41 |
| 6,023,417 A | * | 2/2000 | Hava et al. .................... 363/98 |

FOREIGN PATENT DOCUMENTS

| JP | 53-050422 | 5/1978 |
| JP | 61-105047 | 5/1986 |
| JP | 06-153526 | 5/1994 |
| JP | 09-056177 | 2/1997 |
| JP | 2001-327173 | 11/2001 |
| JP | 2002-119062 | 4/2002 |

* cited by examiner

*Primary Examiner*—Jeffrey Sterrett
(74) *Attorney, Agent, or Firm*—Townsend and Townsend and Crew LLP

(57) ABSTRACT

In calculation 3 phase AC output current Iu, Iv,Iw of an inverter based on the input DC current Idc of the inverter, it is difficult to detect the DC current Idc when the line-to-line voltage pulse width is narrow, thereby the DC current Idc pulse width becomes narrower.

The frequency Fc of the carrier wave C is lowered in a phase whose line-to-line voltage is high, thereby the DC current Idc pulse width is set wider. As a result, the current detection is enabled.

22 Claims, 16 Drawing Sheets

US 6,704,212 B2

PWM INVERTER WITH LONG CARRIER WAVE INSERTION

FIELD OF THE INVENTION

The present invention relates to a method for modulating a pulse width, employed to control such a power converter apparatus as an inverter apparatus that drives an AC motor at a variable speed, as well as a power converter apparatus or an inverter apparatus that employs the method. More particularly, the present invention relates to a method for modulating a pulse width so as to be preferable to detect an AC output current from an output of a DC current detector, as well as a power converter apparatus that employs the method.

BACKGROUND OF THE INVENTION

Generally, each of power converter apparatus used to drive an AC motor at a variable speed respectively reduces the higher harmonics by modulating the pulse width of the output waveform. FIG. 10 shows the power converter apparatus 10 having an inverter unit that uses a conventional pulse width modulation method. In the power converter apparatus 10, a voltage supplied from such an AC power source as a commercial three-phase AC power source is rectified in a rectification circuit 2, then converted to a DC voltage. The DC voltage is then smoothed in a smoothing capacitor 3 so as to obtain a smoothed DC voltage. This smoothed DC voltage is switched by switching elements Qu, Qv, Qw, Qx, Qy, and Qz in the inverter so as to supply a variable voltage and variable frequency AC power to a motor 4. A diode is connected in reverse parallel with the switching elements Qu, Qv, Qw, Qx, Qy, and Qz so as to flow an opposite direction current therein.

A current detector 5 detects a DC current Idc while a current detector 7 detects a U-phase motor current Iu, a V-phase motor current Iv, and a W-phase motor current Iw that flow in the motor 4 based on the detected DC current Idc and gate signals Gu, Gv, Gw, Gx, Gy, and Gz output from a PWM controller 6. The official gazette of Japanese Patent laid-Open No. 6-153526 discloses in detail a method for detecting three-phase AC currents Iu, Iv, and Iw from this DC current Idc by calculating.

A motor controller 8 outputs a U-phase AC voltage command Eu, a V-phase AC voltage command Ev, and a W-phase AC voltage command Ew according to the detected motor currents Iu, Iv, and Iw, as well as a speed command Fr* received from external. The PWM (Pulse Width Modulation) controller 6 outputs the gate signals Gu, Gv, Gw, Gx, Gy, and Gz used to instruct each of the switching elements Qu, Qv, Qw, Qx, Qy, and Qz to make switching according to the AC voltage commands Eu, Ev, and Ew.

FIG. 11 shows a block diagram of the PWM controller 6. A carrier wave generator 601 outputs a carrier wave C (refer to the waveform C shown in FIG. 12), which is a triangle wave of a frequency Fc according to a carrier wave frequency command Fc set by a carrier wave frequency setting device 608. A U-phase comparator 602 that outputs a gate signal Gu compares the U-phase AC voltage command Eu with the carrier wave C to output a H-level (High level) signal when the U-phase AC voltage command Eu is large and a L-level (Low level) signal when the Eu is small in value respectively. An inverter 605 that outputs a gate signal Gx outputs an H-level signal when the gate signal Gu is on the L-level, and outputs an L-level signal when the Gu is on the L-level. Other gate signals Gv, Gy, Gw, and Gz can also be obtained similarly by comparing each of the AC voltage commands Ev and Ew with the carrier wave C.

FIG. 12 shows the waveforms of such components as the PWM controller 6; the horizontal axis denotes the time. In FIG. 12, Eu, Ev, and Ew denote AC voltage commands (phase voltage commands) and C denotes a carrier wave used to modulate the pulse width of each of those AC voltage commands. Gu, Gv, and Gw denote U, V, and W phase gate signals obtained by comparing each of the phase AC voltage commands Eu, Ev, and Ew with the carrier C and setting the signal on the H level when the Eu/Ev/Ew is larger than C and set on the L level when the command is smaller than C in value respectively. When the gate signals Gu, Gv, and Gw are set on the H level, the corresponding switching elements Qu, Qv, and Qw are turned on and the corresponding switching elements Qx, Qy, and Qz are turned off. On the other hand, when the gate signals Gu, Gv, and Gw are set on the L level, the corresponding switching elements Qu, Qv, and Qw are turned off and the corresponding switching elements Qx, Qy, and Qz are turned on. A symbol Vuv denotes a line-to-line voltage between U and V phases. Iu, Iv, and Iw are output currents of the inverter unit. Idc denotes a DC current.

FIG. 13 shows details of a period T1 shown in FIG. 12. The horizontal axis of each waveform denotes the time and the vertical axis denotes, from top to bottom, the gate signals Gu, Gv, and Gw, as well as the line-to-line voltage Vuv, the line-to-line voltage Vvw between V and W phase outputs, the line-to-line voltage Vwu between W and V phase outputs, and the DC current Idc. The current detector 7 detects the motor currents Iu, Iv, and Iw from the DC current Idc with use of the gate signals. The description of the details of this detecting method will be omitted here, since it is described in detail in the official gazette of Japanese patent Laid-Open No. 6-153526.

As described in the official gazette of Japanese Patent Laid-Open No. 6-153526, the gate signals Gu, Gv, and Gw can be represented by binary codes; eight combinations of those codes are possible. Concretely, the combinations are V0=(1,1,1), V1=(0,1,1), V2=(1,0,1), V3=(0,0,1), V4=(1,1,0), V5=(0,1,0), V6=(1,0,0), and V7=(0,0,0). The one phase is set on the H level in V3, V5, and V6 while two phases are set on the H level in V1, V2, and V4.

However, when the U-phase AC voltage command Eu, the V-phase AC voltage command Ev, and the W-phase AC voltage command Ew are small in amplitude, the periods Tb, Tc, Te, and Tf in which the DC current Idc flows respectively become short. Although the Idc rises instantly in FIG. 13, since its waveform is an ideal one, the Idc actually includes a delay time in its rising. In some cases, an overshoot occurs in the Idc. Consequently, when the Idc flowing period is short, accurate sampling of current values comes to be difficult.

Furthermore, as disclosed in the official gazette of Japanese Patent Laid-Open No. 9-56177, a dead time (or non-lap period) is set between gate patterns so as to prevent the upper/lower arm of the inverter from being short-circuited to be caused by a delay in the operation of a switching element.

FIGS. 14 through 16 show examples in which such a dead time period is set respectively. In FIG. 14, a section, which is concretely a period A, includes two dead time periods Tδ. In the period A ranged from an intersection point between the W-phase voltage command value and the carrier wave waveform to another intersection point between the U-phase voltage command value and the carrier wave waveform, the gate patterns V4 and V6 that can detect a current in the DC part respectively continue. FIG. 15 shows timings of the gate signals when a small value is set for each of the phase commands shown in FIG. 14. Generally, a dead time period Tδ is set for a certain time. Although the period A becomes short, the dead time period T δ exists with the certain time. Consequently, no current can be detected in the period A when the period A becomes shorter than the two dead time periods 2Tδ. FIG. 16 shows the timings of the gate signals when the carrier wave frequency is raised to make the carrier cycle short as shown in FIG. 14. Also in this connection, while the period A is set shortly, the Tδ is kept constant. Current detection is disabled when the period A becomes shorter than 2Tδ.

Such way, the current sampling period becomes short, thereby current sampling is difficult due to the delay of the actual current in its rising, occurrence of the overshoot of the DC current Idc, the presence of a dead time period, etc.

This is why the carrier wave frequency must be lowered to secure a sampling period enough. When the carrier frequency is lowered, however, a problem rises; the magnetic noise from the motor and/or load increases as disclosed in the official gazettes of Japanese Patent Laid-Open No. 61-105047 and No. 53-50422. The official gazette of Japanese Patent Laid-Open No. 61-105047 thus recommends that the carrier wave frequency should be set at 8 kHz to 16 kHz so as to reduce the magnetic noise.

SUMMARY OF THE INVENTION

It is an object of the present invention to solve the above conventional problems, thereby providing a method for modulating a pulse width so as to secure a sampling time enough to detect a current, as well as a power converter apparatus or an inverter apparatus that employs the method.

It is an another object of the present invention to suppress magnetic noise of induction motor which is a load of the power converter apparatus or the inverter apparatus that employs the method.

In an aspect of the invention, a pulse width modulation (PWM) method modulates the pulse width based on a modulated wave and a carrier wave and supplies gate signals to a power converter, and detects each phase AC current of the power converter based on a detected DC current and the gate signals, wherein the PWM method inserts the carrier wave with a long carrier cycle longer than the preset carrier cycle periodically, and samples the detected DC current during the long carrier cycle.

In an another aspect of the invention, when the AC voltage of said power converter is under a predetermined value, a pulse width modulation (PWM) method inserts only one cycle of the carrier wave with the long carrier cycle of an integer multiple of the preset carrier cycle every once at 1 ms or over.

In an another aspect of the invention, a pulse width modulation (PWM) method inserts the carrier wave with the long carrier cycle within a range of π/6 rad around the maximum value of the line-to-line voltage of the AC periodically.

DESCRIPTION OF THE PREFERRED EMBODIMENTS

Figure 1:
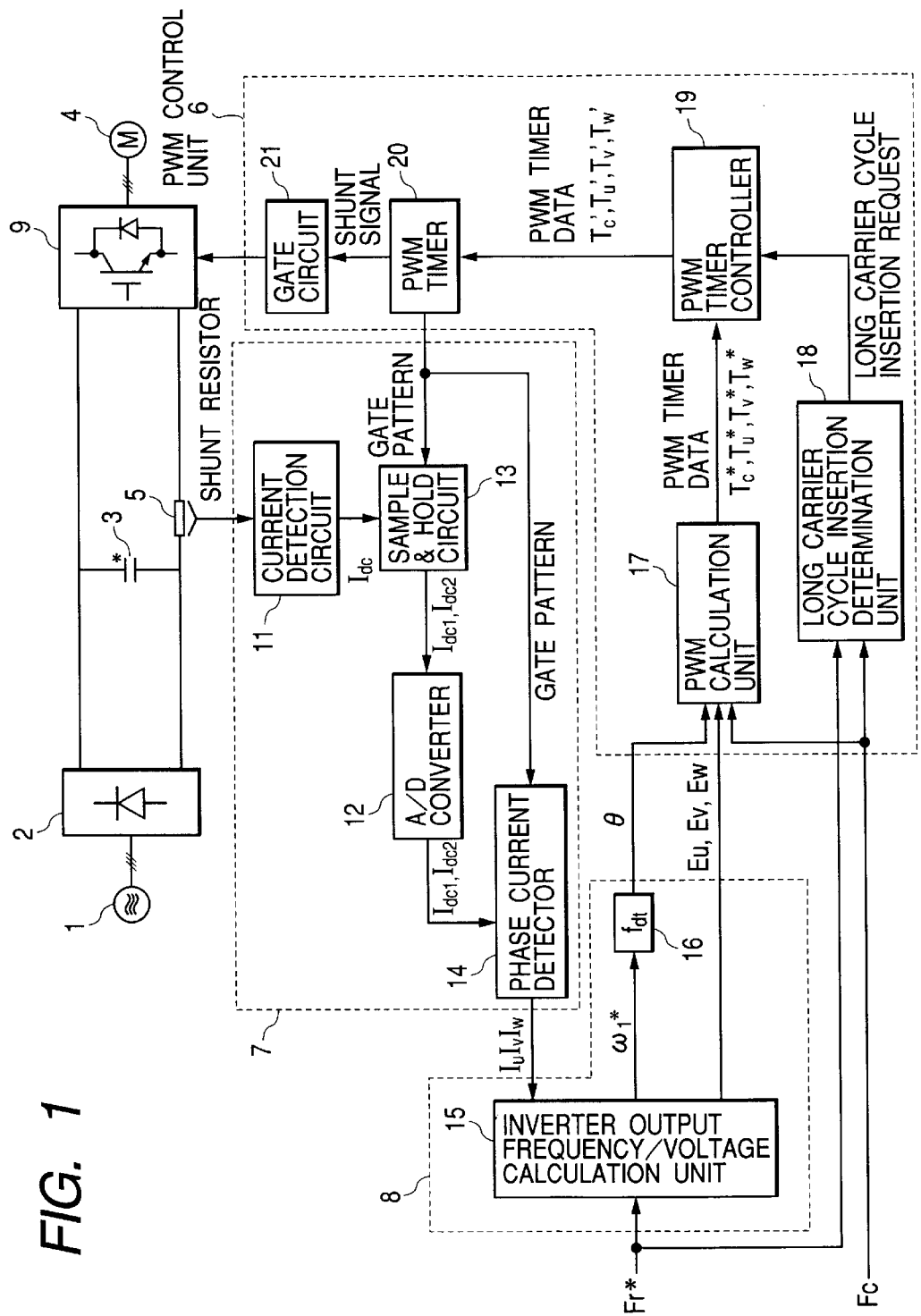
FIG. 1 is a block diagram of a power converter apparatus in the first embodiment of the present invention.

Hereunder, the first embodiment of the present invention will be described with reference to the accompanying drawings. FIG. 1 shows a block diagram of a power converter apparatus that controls an AC motor at a variable speed. An AC power supplied from an AC power source 1 such as a three-phase commercial power source is converted to a smoothed DC power by a rectification circuit 2 and a smoothing capacitor 3. This smoothed DC power is thus converted to an AC power having a variable frequency and a variable voltage by an inverter 9 and used to drive an induction motor 4 at a variable speed. Both frequency and voltage output from the inverter 9 are controlled from an inverter control circuit through a gate circuit 21.

The inverter control circuit in this embodiment uses a microcomputer. An inverter output frequency/voltage calculation unit 15 receives an output frequency command Fr* and each of the phase current values Iu, Iv, and Iw of the induction motor to calculate a primary angle frequency command ω1* and inverter output voltage commands Eu, Ev, and Ew. An integrator 16 integrates the ω1* and outputs the result to the PWM calculation unit 17 as a phase command θ. A shunt resistor 5 and a current detection circuit 11 are used to detect the DC current Idc respectively. A sample & hold circuit 13 holds the detected Idc as a detected current Idc1 and Idc2 based on a gate pattern received from a PWM timer 20 when the detection is enabled. An A/D converter 12 converts both of Idc1 and Idc2, which are analog values, to digital values and outputs the digital values to each of the phase current detectors 14. The respective phase current detector 14 calculates respective phase current Iu, Iv, and Iw based on the digital values Idc1 and Idc2 and the gate pattern signal received from the PWM timer 20, and the outputs them to inverter output frequency/voltage calculation unit 15. The PWM calculation unit 17 calculates the data Tc*, Tu*, Tv*, and Tw* of the PWM timer 20 according to the phase command $f$, the output voltage commands Eu, Ev, and Ew, as well as the carrier wave cycle command Fc. The long carrier cycle insertion determination unit 18 determines whether to insert a long carrier cycle according to the output frequency command Fr* and the carrier wave cycle command Fc. The PWM timer controller 19 also sets data in the PWM timer 20 according to a request from the long carrier frequency insertion determination unit 18.

Next, the configurations and operations of the PWM timer controller 19 and the long carrier cycle insertion determination unit 18 featured by the present invention will be described.

Figure 2:
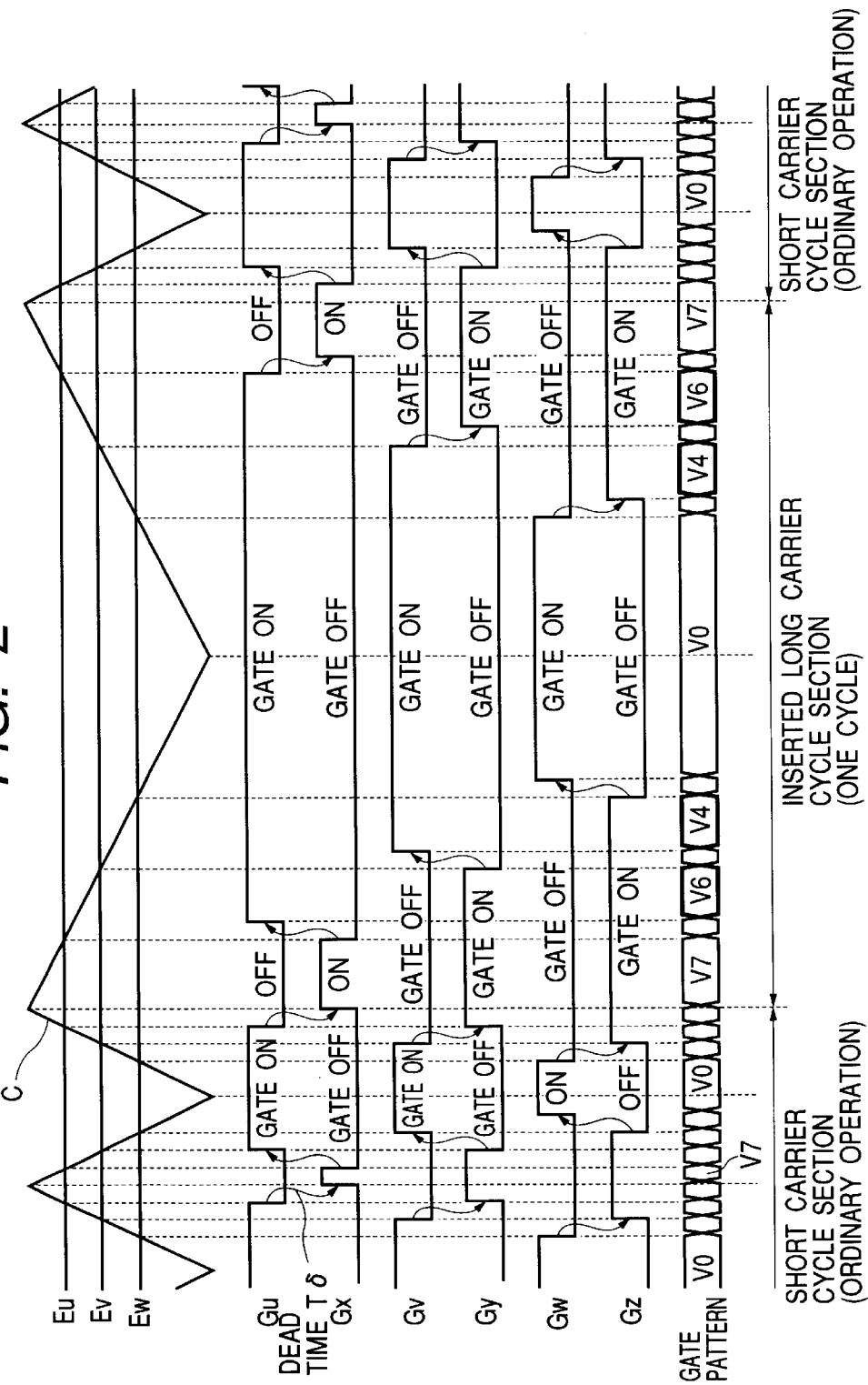
FIG. 2 is a timing chart of gate signals used in the first embodiment of the present invention.

FIG. 2 shows the timings of the gate signals Gu, Gx, Gv, Gy, Gw, and Gz in this first embodiment. If a long carrier cycle insertion request is issued from the long carrier cycle insertion determination unit 18 during an operation in an ordinary carrier cycle in which no current detectable gate pattern exists, the PWM timer controller 19 sets PWM timer data multiplied by an integer multiple (four times in this embodiment) in the PWM timer 20, thereby the long carrier cycle begins at a crest of the triangular carrier waveform. In the example shown in FIG. 2, patterns V4 and V6 having a length enough to detect a current respectively occur and current detection is done in each of the sections. Because a current detectable period always appears in such the long carrier cycle, insertion of only one long carrier cycle will do. Multiplying of the PWM timer data in the PWM timer controller 19 by an integer multiple is to prevent the processing of the inverter apparatus from being discontinued. Such an integer multiple enables a long carrier cycle to start at a crest of the carrier wave and end at the next crest of the carrier wave. The long carrier cycle comes to end at a timing synchronized with a crest part of the original carrier wave. This is why the processing by the inverter apparatus continues.

Figure 3:
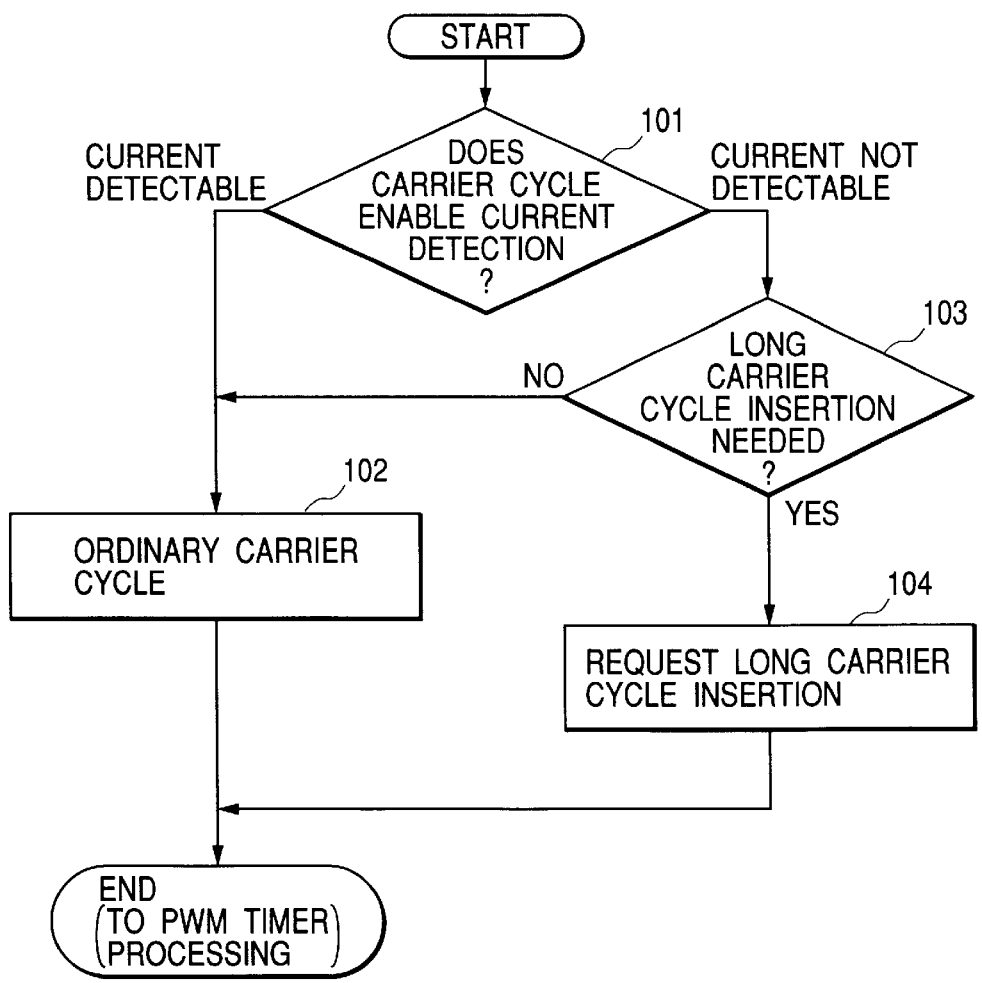
FIG. 3 is a flowchart of determination processings for long carrier cycle insertion in the first embodiment of the present invention.
Figure 4:
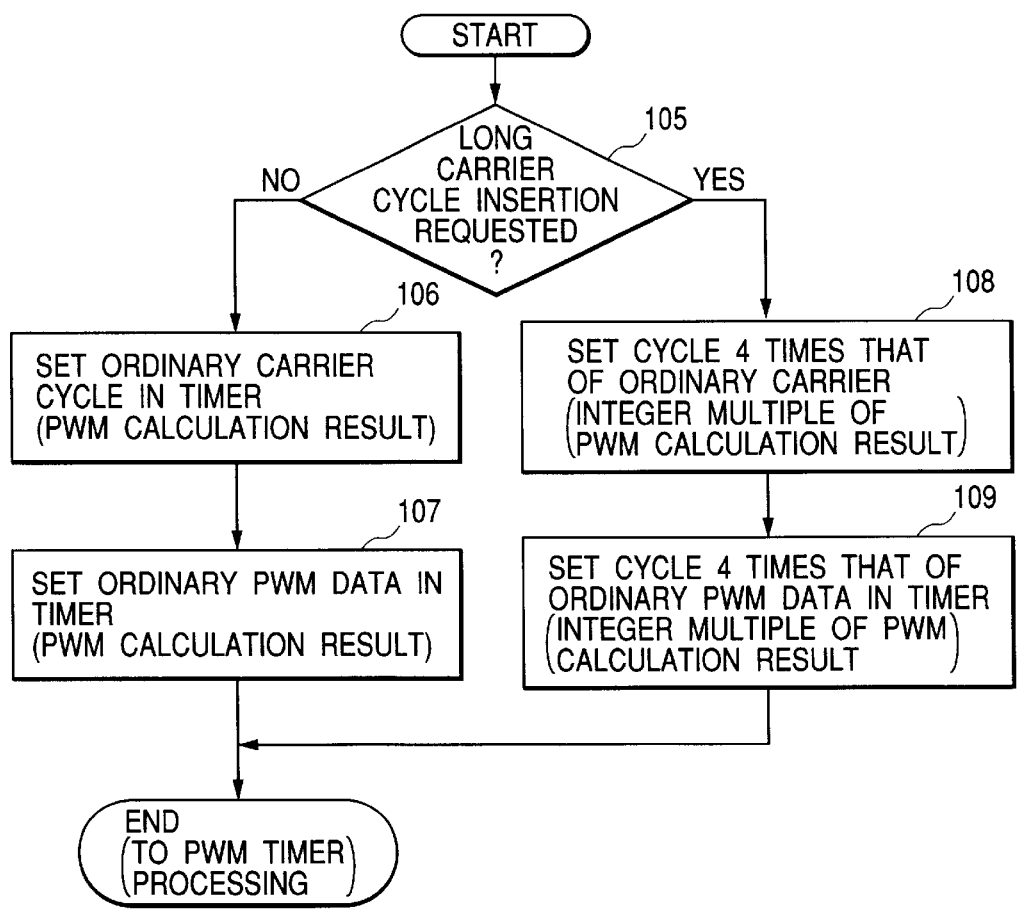
FIG. 4 is a flowchart for controlling a PWM timer in the first embodiment of the present invention.

FIGS. 3 and 4 show flowcharts of the processings by the long carrier cycle insertion determination unit 18 and the PWM timer controller 19.

In FIG. 3, the determination unit 18 determines whether or not a current can be detected according to both of the output frequency command Fr* and the carrier wave cycle command Fc in step 101. When the determination result is YES, an ordinary carrier cycle is set as the carrier cycle in step 102, and ends the processing. When the result is NO, the unit 18 determines whether or not the long carrier cycle is needed based on the timing is synchronized with the calculating cycle of the inverter output frequency/voltage calculation unit 15 (or another cycle) in step 103. When there is need to insert a long carrier cycle, the unit 18 issues a long carrier insertion request in step 104 and ends the processing. When there is no need to insert such a long carrier cycle in step 103, the unit 18 an ordinary carrier cycle is set as the carrier cycle in step 102, and ends the processing.

When the unit 18 issues a long carrier insertion request in step 105, the controller 19 multiplies the PWM timer data received from the calculation unit 17 by an integer multiple, then sets the result in the PWM timer 20 and ends the processing in steps 108 and 109. When receiving no long carrier insertion request in step 105, the controller 19 sets the PWM timer data received from the calculation unit 17 as is in the PWM timer 20 and ends the processing in steps 106 and 107.

In a test performed with use of a real machine, it is confirmed that insertion of a long carrier cycle, when it is done every once at 1 ms or over or preferably every once at a few ms or over, can reduce the noise of the induction motor effectively.

According to the first embodiment, the carrier wave as shown in FIG. 2 can be generated in the above steps, thereby current detection is enabled. In addition, because the low carrier frequency is set only in part of the ordinary high carrier frequency, the embodiment makes it possible to reduce the magnetic noise at the time of low motor speed operation while the current detection accuracy is kept.

Figure 5:
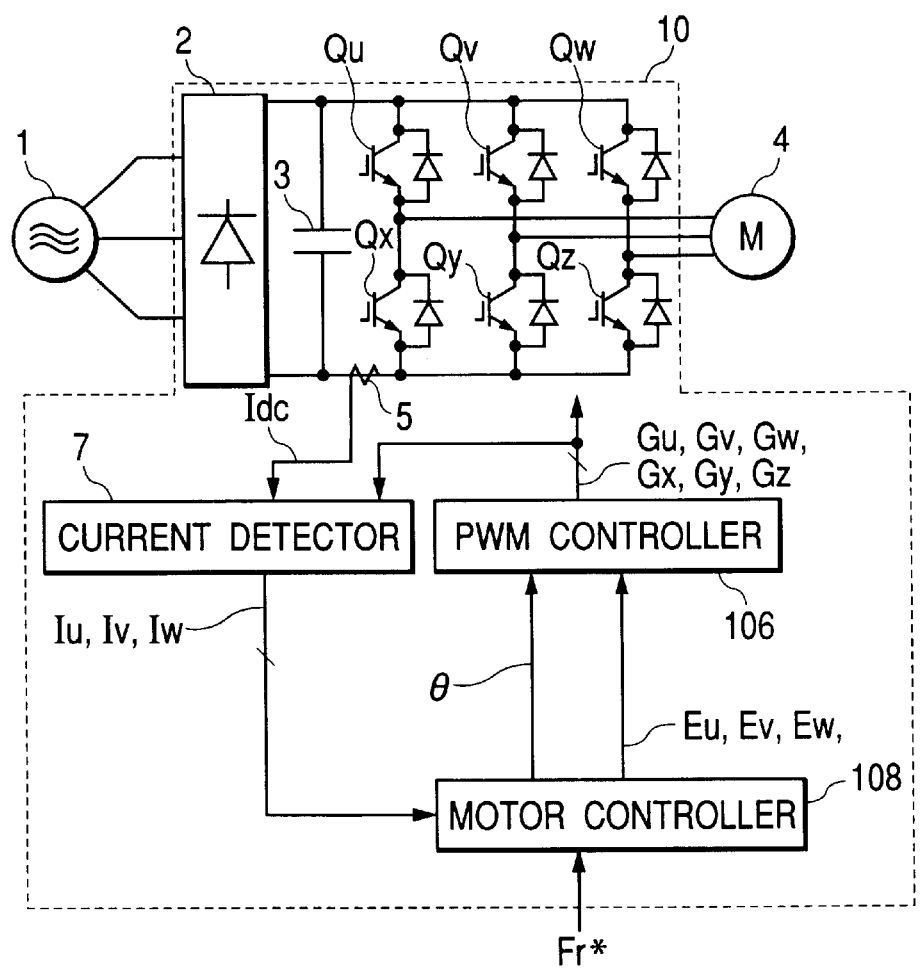
FIG. 5 is a block diagram of a power converter apparatus in the second embodiment of the present invention.
Figure 10:
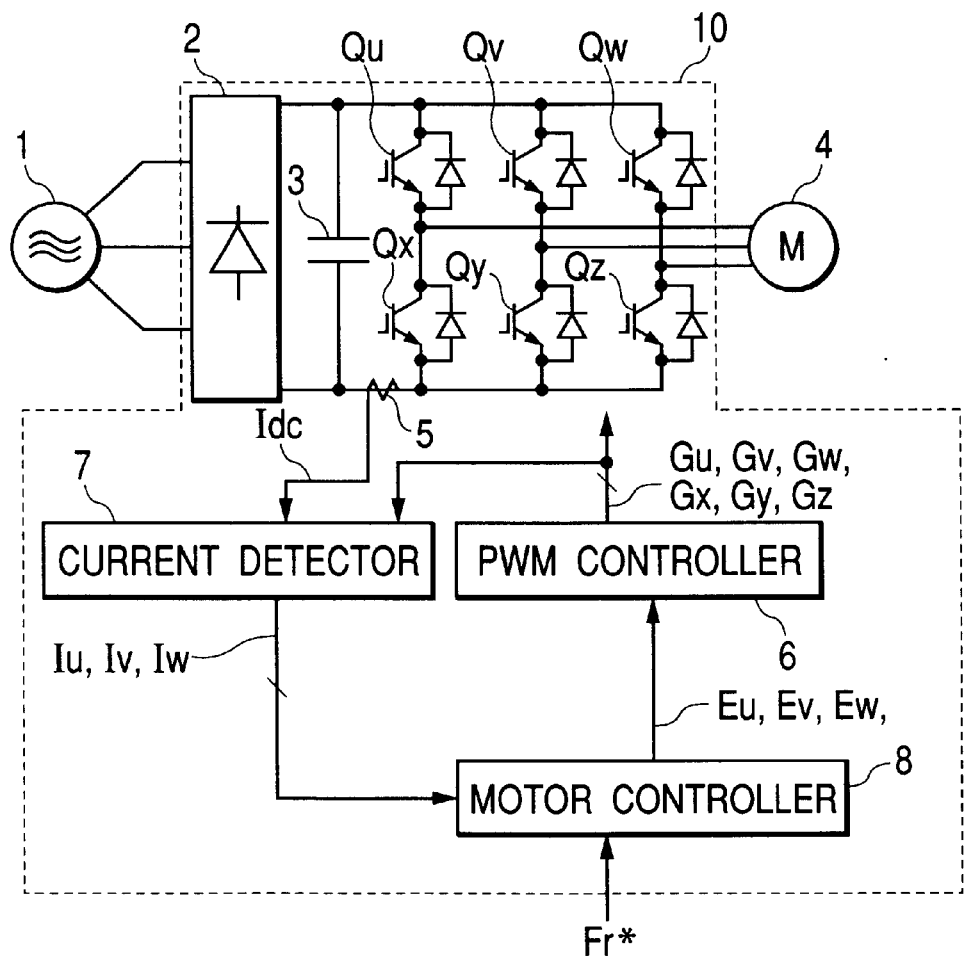
FIG. 10 is a block diagram of a conventional power converter apparatus.

Next, the second embodiment of the present invention will be described. FIG. 5 shows a block diagram of a power converter apparatus in the second embodiment. In FIG. 5, the same reference numerals are used for the same items as those shown in FIG. 10 to avoid redundant description.

In FIG. 5, reference numeral 108 denotes a motor controller and reference numeral 106 denotes a PWM controller. The motor controller 108 outputs the U-phase AC voltage command Eu, the V-phase AC voltage command Ev, the W-phase AC voltage command Ew, and the phase θ according to the detected motor currents Iu, Iv, and Iw, as well as the output frequency command Fr* received from external. The PWM controller 106 outputs the gate signals Gu, Gv, Gw, Gx, Gy, and Gz used to control the switching elements Qu, Qv, Qw, Qx, Qy, and Qz according to the AC current commands Eu, Ev, and Ew, as well as the phase command θ.

Figure 6:
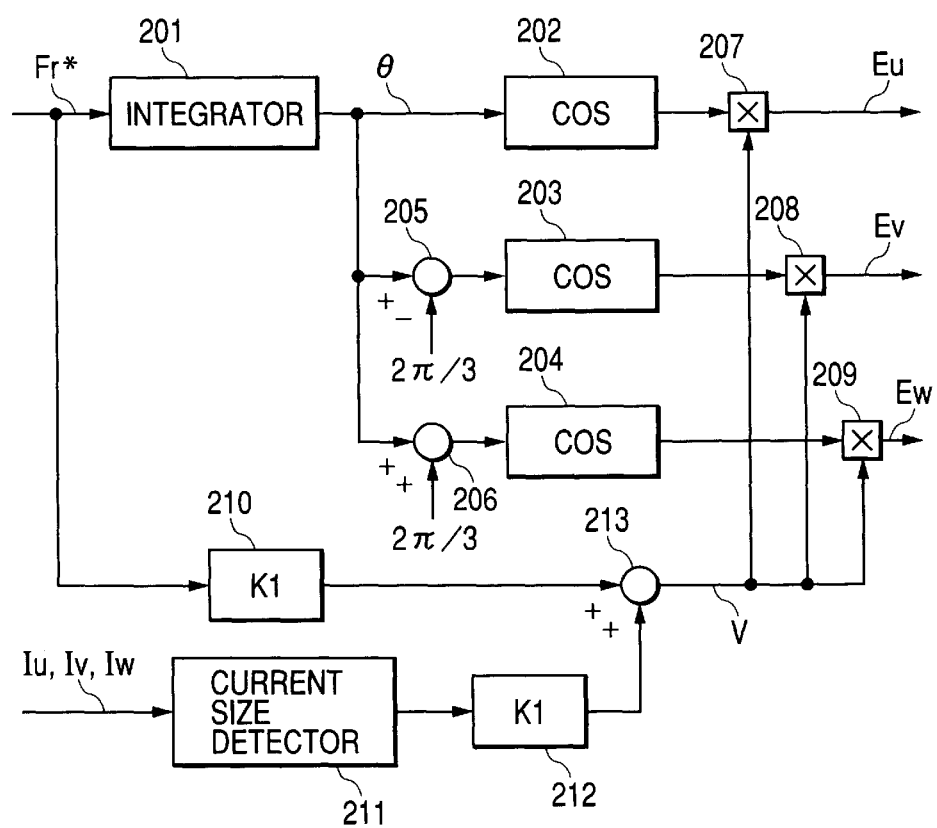
FIG. 6 is a block diagram of a motor controller in the second embodiment of the present invention.

Next, a block diagram of the motor controller 108 will be described with reference to FIG. 6. In FIG. 6, reference numeral 201 denotes an integrator, 202 to 204 denote cosine function generators, reference numeral 205 denotes a subtractor, reference numerals 206 and 213 denote adders, reference numerals 207 to 209 denote multipliers. Reference numeral 210 and 212 denote coefficient multipliers used to multiply signals by a control gain K1 and K2. Reference numeral 211 denotes a current size detector.

The integrator 201 integrates the speed command Fr* to calculate the phase θ. The cosine function generator 202 calculates a cosine function cos θ corresponding to the phase θ, and outputs the cos θ. The multiplier 207 multiplies the output of the cosine function generator 202 and the voltage size V that is the output of the adder 213 to calculate the U-phase AC voltage command Eu. The subtractor 205 subtracts $2\pi/3$ rad from the phase θ and the cosine function generator 203 calculates the cosine function $\cos(θ-2\pi/3)$ and outputs the result. The multiplier 208 multiplies the output from the cosine function generator 203 by the voltage size V to calculate the V-phase AC voltage command Ev. The adder 206 adds $2\pi/3$ [rad] to the phase θ and the cosine function generator 204 calculates the cosine function $\cos(θ+2\pi/3)$ and outputs the result. The multiplier 209 multiplies the output of the cosine function generator 204 by the voltage size V to calculate the W-phase AC voltage command Ew. The coefficient multiplier 210 multiplies the speed command Fr* by the control gain K1. The current size detector 211 converts the motor currents Iu, Iv, and Iw that are three-phase signals to two-phase signals, then finds the current vector size by regarding each of the converted two-phase signals as a component of a current vector on the coordinate axes that cross each other orthogonally. The coefficient multiplier 212 multiplies the output of the current size detector 211 by the control gain K2. The adder 213 adds up the output of the coefficient multiplier 210 and the output of the coefficient multiplier 212 to calculate the voltage size V.

Because the above configuration is taken for the motor controller 108 as described above, the output of the coefficient multiplier 210 becomes a value (V/F fixed) that makes the voltage size V and the speed command Fr* proportional to each other. Then, the current size detector 211 detects the current size and multiplies the size by the control gain K2, thereby the estimated value of the primary voltage drop to occur in the motor 4 is added to the current size. As a result, the torque characteristic that is stable even at a low speed is realized. On the other hand, each of the cosine function generators 202 to 204 generates a cosine wave whose phase differs by the $2\pi/3$ rad from others. Consequently, the AC voltage commands Eu, Ev, and Ew become symmetrical three-phase voltages.

Figure 7:
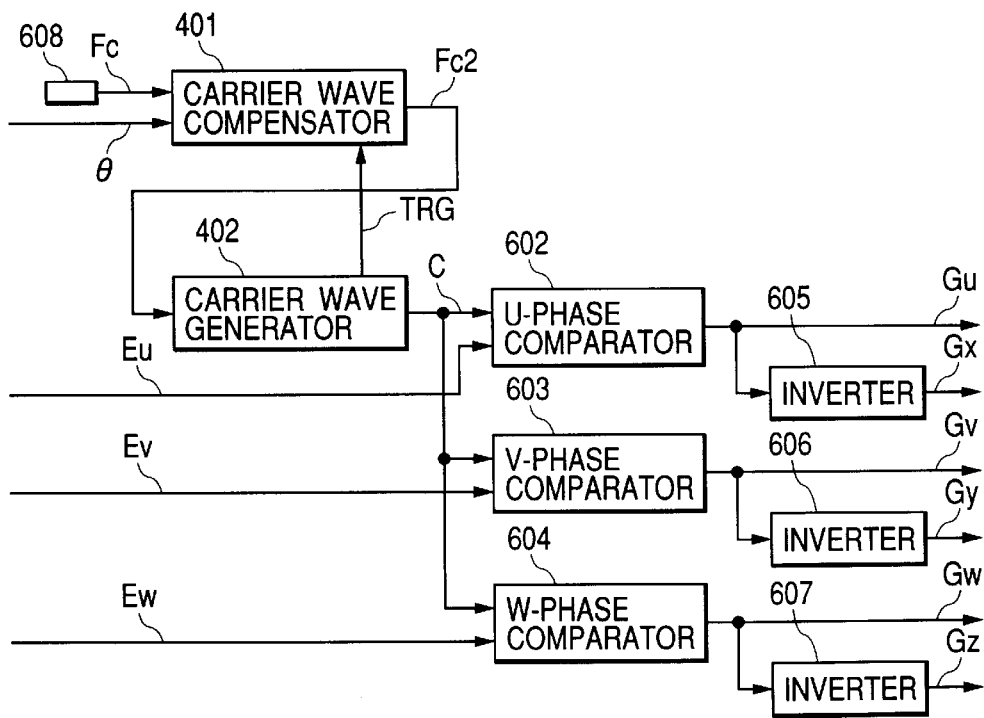
FIG. 7 is a block diagram of a PWM controller in the second embodiment of the present invention.
Figure 11:
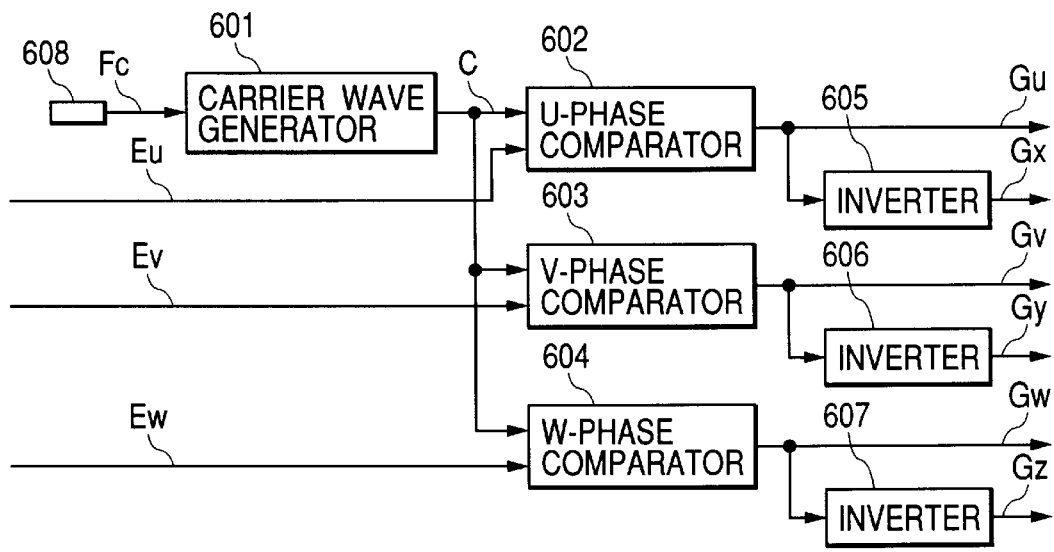
FIG. 11 is a block diagram of a conventional PWM controller.
Figure 12:
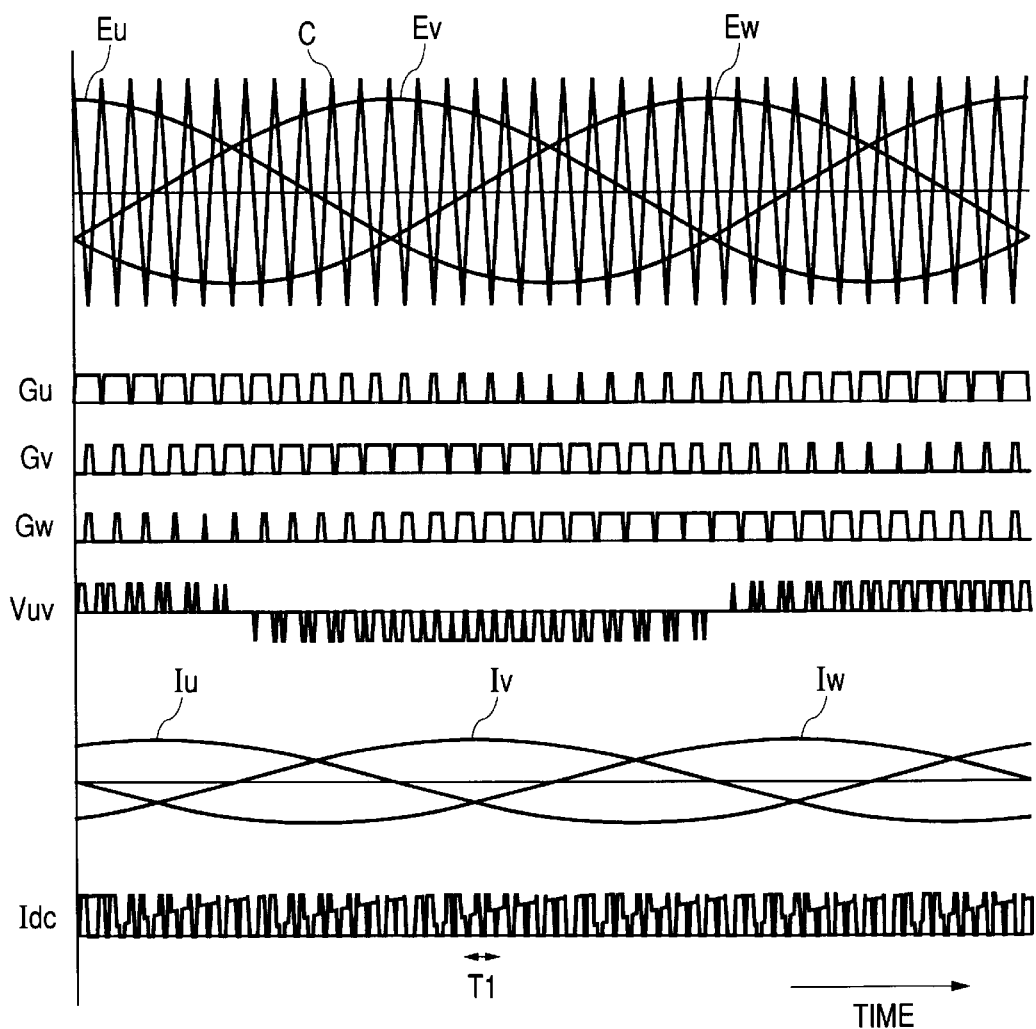
FIG. 12 is a waveform chart for the operation of each conventional component.
Figure 13:
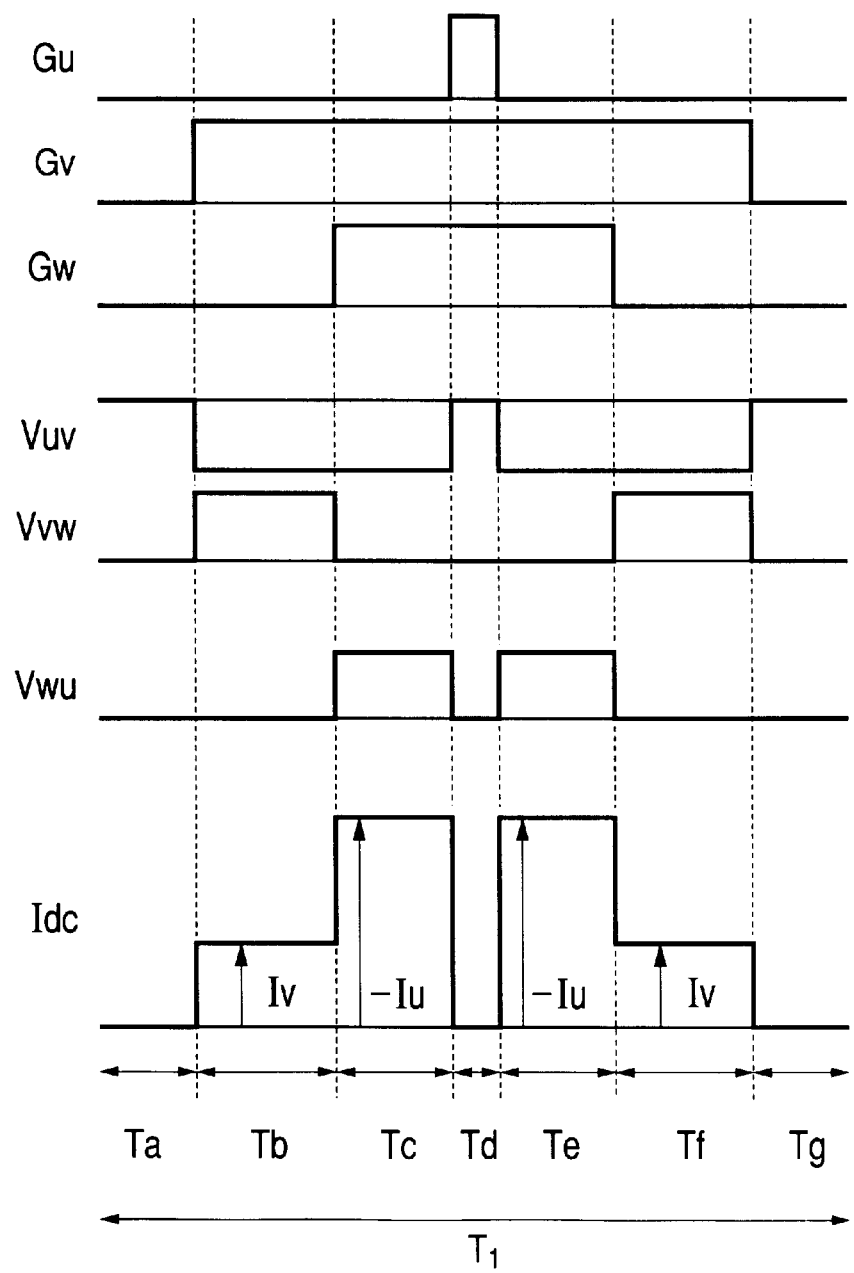
FIG. 13 is an expanded view of the waveforms at time T1 shown in FIG. 12.
Figure 14:
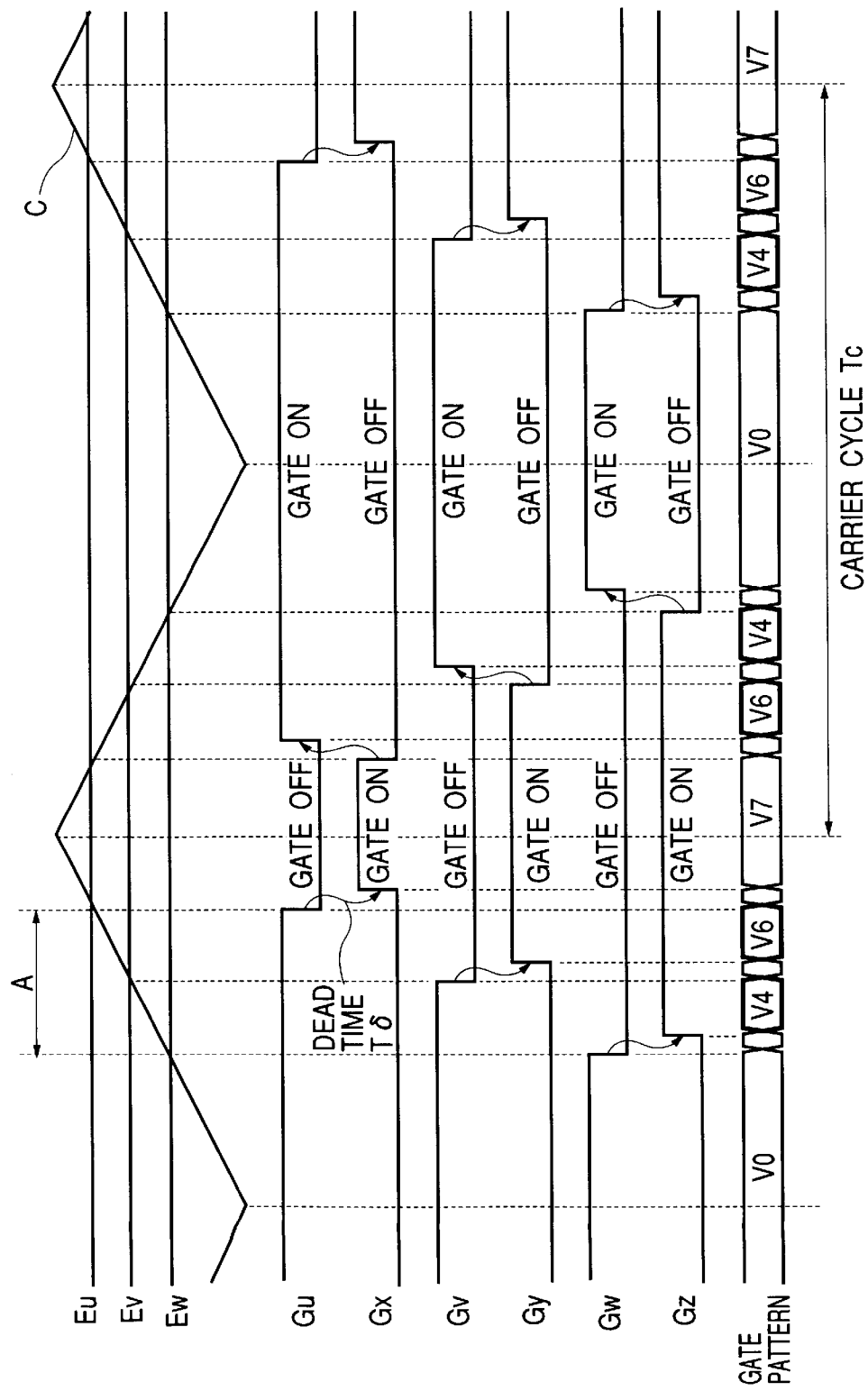
FIG. 14 is a conventional gate signal timing chart.
Figure 15:
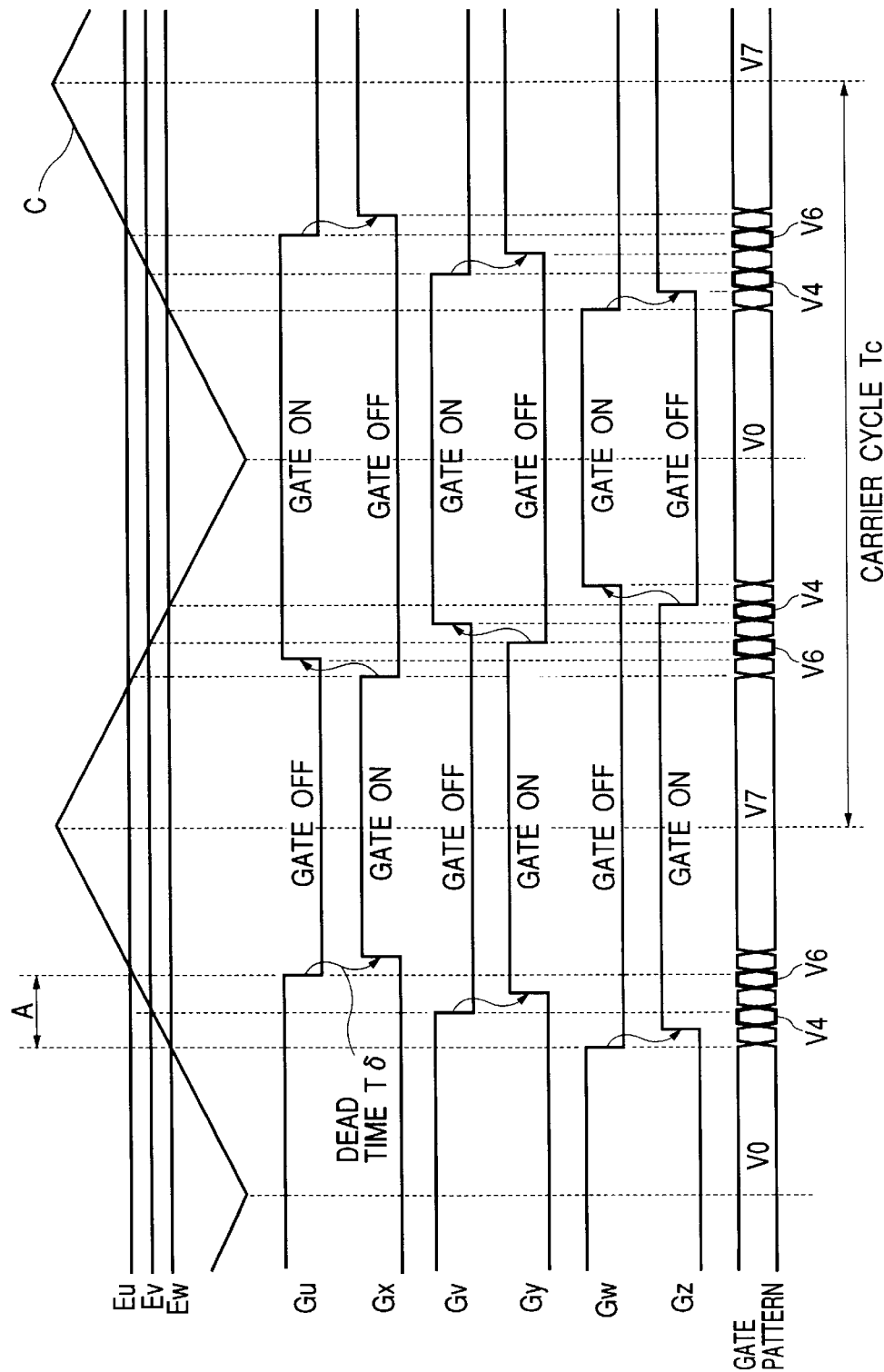
FIG. 15 is another conventional gate signal timing chart when each phase voltage command value is set smaller.
Figure 16:
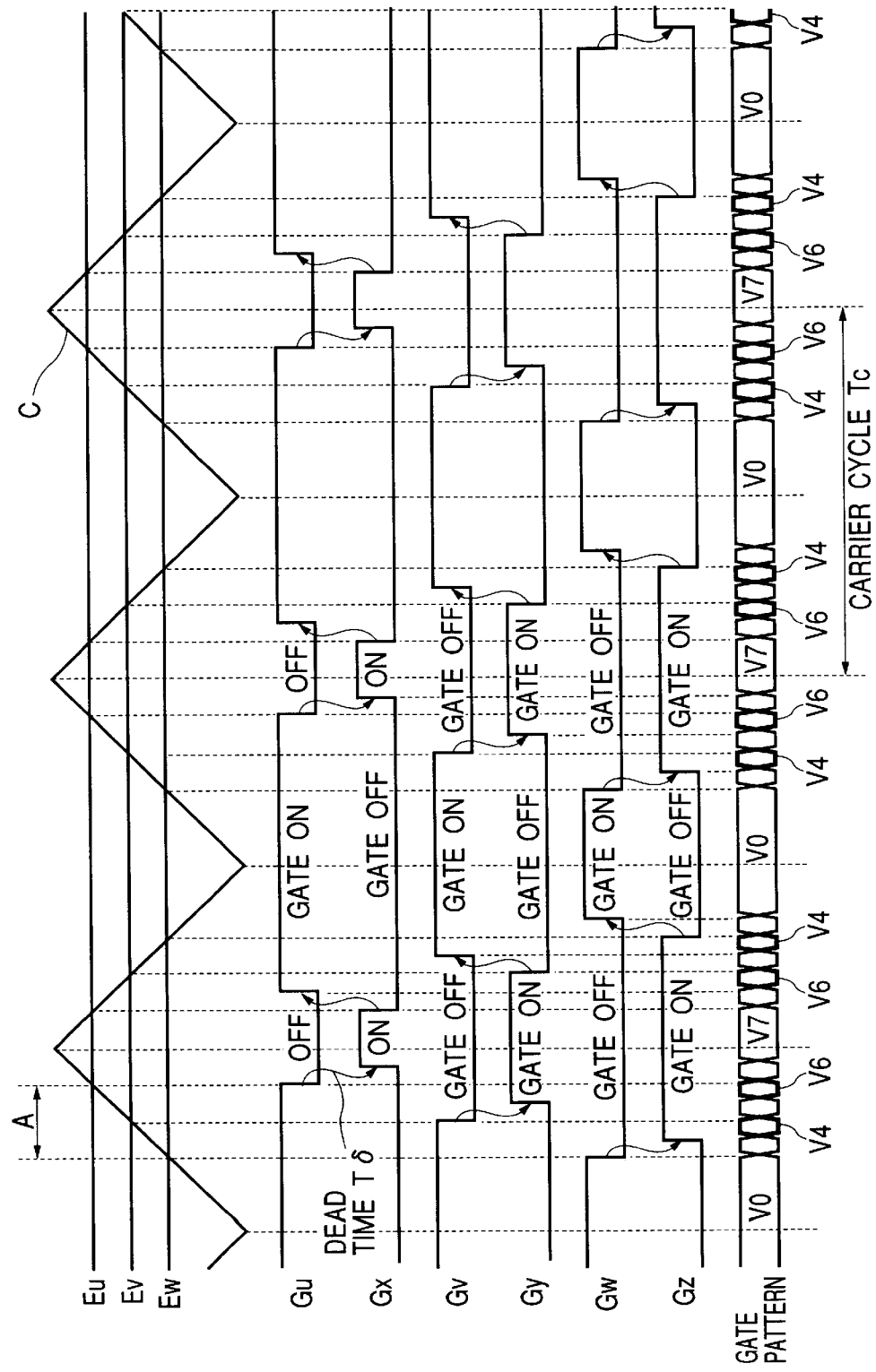
FIG. 16 is still another conventional gate signal timing chart when the carrier wave frequency is set higher.

Next, the configuration of the PWM controller 106 will be described with reference to FIG. 7. In FIG. 7, the same reference numerals will be used for the same items as those shown in FIG. 11, avoiding redundant description.

In FIG. 7, reference numeral 401 denotes a carrier wave compensator and reference numeral 402 denotes a carrier wave generator. The carrier wave compensator 401 outputs the second carrier wave frequency command Fc2 according to the carrier wave cycle command Fc, the phase $\theta$, and the output of the carrier wave generator 402. The carrier wave generator 402 outputs a carrier wave C (see the waveform C shown in FIG. 9), which is a triangular wave of the second carrier wave frequency command Fc2, according to the second carrier wave frequency command Fc2 and a signal TRG at the maximum value of the carrier wave C, that is, at a crest of the triangular wave.

Figure 8:
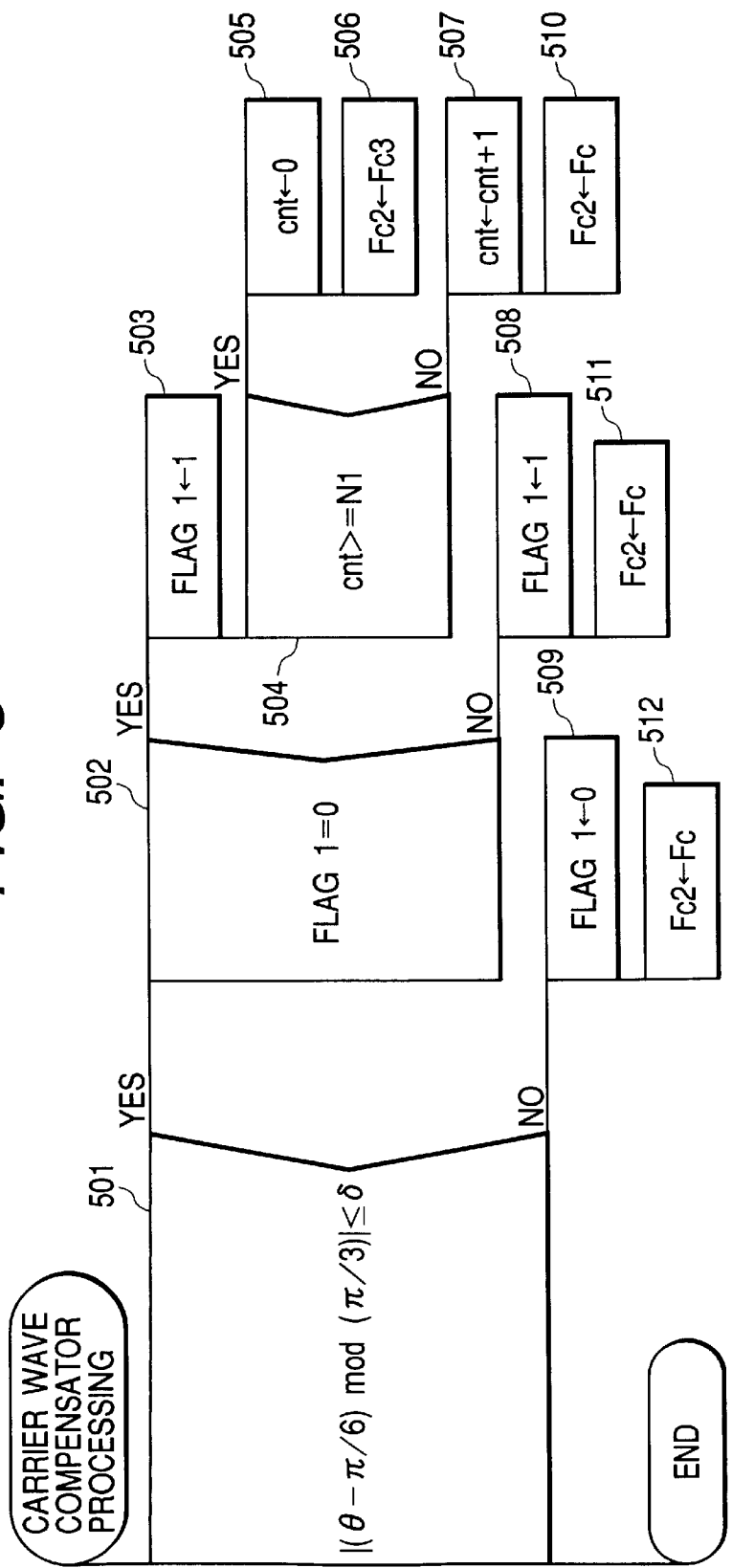
FIG. 8 is a flowchart for the processings by a carrier wave compensator in the second embodiment of the present invention.

FIG. 8 is a flowchart for describing the details of the processings by the carrier wave compensator 401. The carrier wave compensator 401, when TRG is output from the carrier wave generator 402, executes the processings shown in FIG. 8. In step 501, the carrier wave compensator 401 subtracts $\pi/6$ from the phase $\theta$. Then, the carrier wave compensator 401 finds the remainder of the division of the subtraction result by $\pi/3$. The remainder means a value obtained by multiplying the integer part of the quotient of the division by $\pi/3$, which is a divisor, then subtracting the result of the multiplication from the subtraction result, which is a dividend. The absolute value of the obtained remainder is then compared with the reference value $\delta$ set smaller than $\pi/6$. At this time, the reference value $\delta$ should be set smaller than $\pi/6$, since currents of two phases can be detected easily within a range of $\pm\pi/6$ rad around the maximum value of the line-to-line voltages Vuv, Vvw, or Vwu. As a result of the comparison, when the absolute value of the remainder is under the reference value $\delta$, the carrier wave compensator 401 executes the processing in step 502. When the absolute value is larger than the reference value $\delta$, the carrier wave compensator 401 executes the processing in step 509. In step 502, the carrier wave compensator 401 checks if "0" is set in the FLAG 1. When "0" is set in the FLAG 1, the carrier wave compensator 401 executes the processing in step 503. When "1" is set in the FLAG 1, the carrier wave compensator 401 executes the processing in step 508. In step 503, the carrier wave compensator 401 sets "1" in the FLAG 1, then executes the processing in step 504. In step 504, the carrier wave compensator 401 compares the value in the counter cnt with the set value N1. When the value cnt is over the set value N1, the carrier wave compensator 401 executes the processing in step 505. When the value cnt is under the set value N1, the carrier wave compensator 401 executes the processing in step 507. Instep 505, the carrier wave compensator 401 clears the counter cnt, then executes the processing in step 506. In step 506, the carrier wave compensator 401 outputs the third carrier wave frequency command Fc3 (frequency command correspond to the carrier wave with a long carrier cycle), which is a lower frequency than the carrier wave cycle command Fc as the second carrier wave frequency command Fc2 and terminates the processing. In step 507, the carrier wave compensator 401 updates the counter cnt by adding "1" to the counter value, then executes the processing in step 510. In steps 510, 511, and 512, the carrier wave compensator 401 outputs the carrier wave cycle command Fc (ordinary cycle carrier frequency command) as a second carrier wave frequency command Fc2 respectively and terminates the processing. In step 508, the carrier wave compensator 401 sets "1" in the FLAG 1, then executes the processing in step 511. In step 509, the carrier wave compensator 401 sets "0" in the FLAG 1 and executes the processing in step 512.

Next, the operations in this embodiment will be described concretely with reference to FIG. 9.

Figure 9:
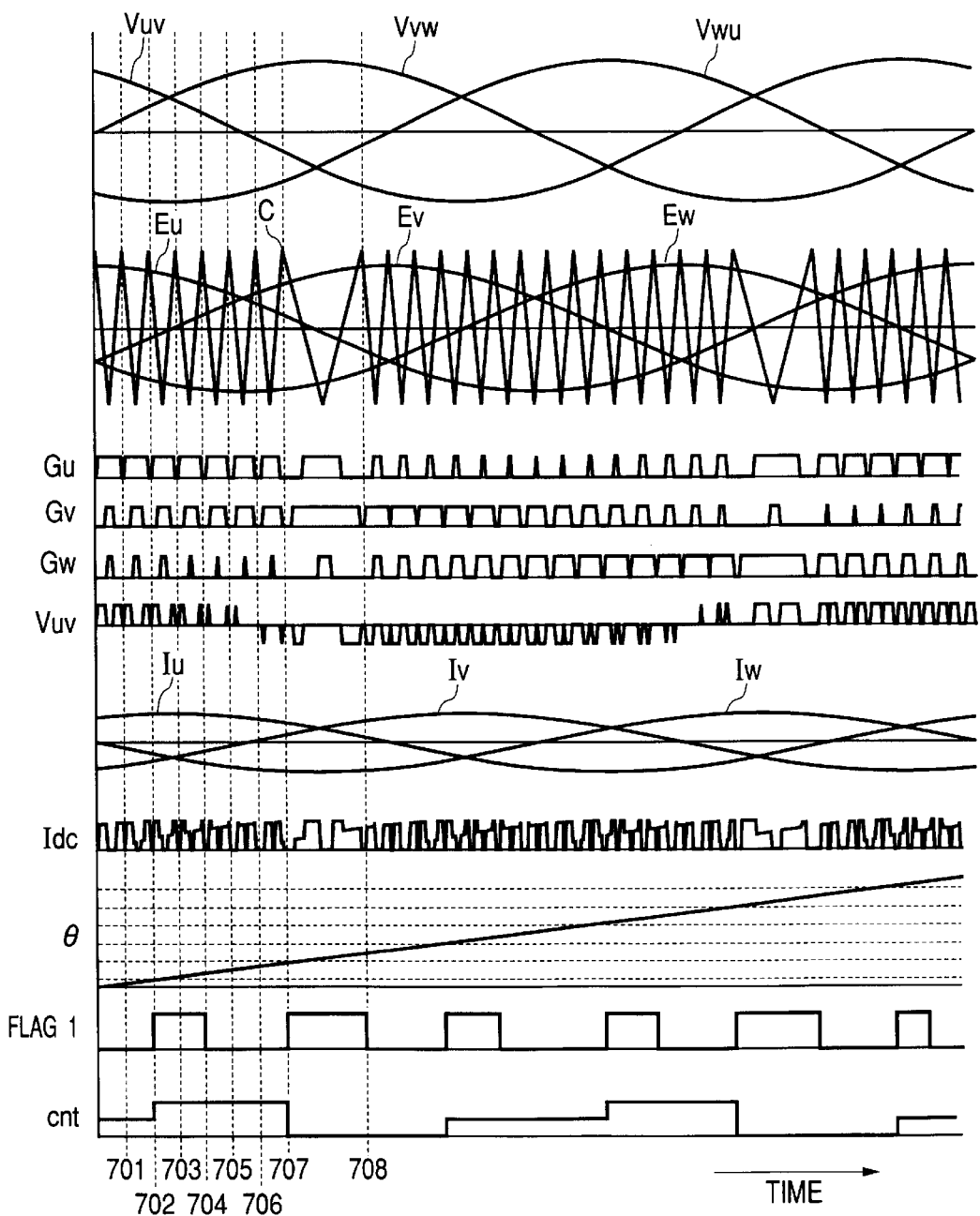
FIG. 9 is a waveform chart of the operation of each component in the second embodiment of the present invention.

FIG. 9 shows the waveforms of such components as the PWM controller 106; the horizontal axis denotes the time. Each of the waveforms in FIG. 9 will be described sequentially from top to bottom.

The first three waveforms are those of the line-to-line voltages Vuv, Vvw, and Vwv obtained from the AC voltage commands Eu, Ev, and Ew. The second four waveforms are those of the AC voltage commands Eu, Ev, and Ew, as well as the carrier wave used to modify the pulse width of each AC voltage command. The third waveform is that of the gate signal Gu. The fourth waveform is that of the gate signal Gv. The fifth waveform is that of the gate signal Gw. The sixth waveform is that of the line-to-line voltage Guv between the U-phase output connected to the switching element Qu and the V-phase output connected to the switching element Qv. The seventh three waveforms are those of the U-phase motor current Iu, the V-phase motor current Iv, and the W-phase motor current Iw, which flow in the motor 4 from the power converter 10 respectively. The eighth waveform is that of the DC current Idc. The ninth waveform is that of the phase $\theta$. The horizontal dotted lines denote, from bottom to top, $\pi/6$, $\pi/2$, $5\pi/6$, $7\pi/6$, $3\pi/2$, and $11\pi/6$, that is, the $\theta$ in which the left side in the processing in step 501 in FIG. 8 becomes 0, and the absolute value of one of the line-to-line voltages becomes the maximum. The tenth waveform is that of the FLAG 1. The eleventh waveform (bottom) is that of the counter cnt.

It is assumed here that "1" is set in the counter cnt as the initial value and "2" is set as the set value N1. In this embodiment, Arrival of above mentioned phase $\theta$ in which the absolute value of one of the line-to-line voltages becomes the maximum; i.e. time 702, 707, . . . , is counted. And once to 3 times, the carrier wave with the long carrier cycle is inserted. Moreover, in the every crest of the carrier wave C, the above-mentioned judgment processing is executed. If one of the line-to-line voltage is close to maximum, the detection of current will become easy, and the judgment of processing 501 serves as "Yes" and progresses to step 502. As stated above, the reference value $\delta$ of this judgment is set as the value smaller than $\pi/6$.

First, the carrier wave C takes the maximum value at time T701, so that the carrier wave generator 402 outputs TRG and the carrier wave compensator 401 executes the processings shown in FIG. 8. Since this time T701 is separated from the phase which the line-to-line voltage is maximum, the judgment result of the step 501 is "No". Thus, the controller 106 sets "0" in the FLAG 1 instep 509. Then, the controller 106 outputs an carrier wave cycle command Fc as the second carrier wave frequency command Fc2 in step 512.

Next, a description will be made for the processing executed by the carrier wave compensator 401. Since this time point is near when the absolute value of the line-to-line voltage Vwu is the maximum, the judgment result of step 501 is "Yes", and step 502 is performed. Because "0"is set in the FLAG 1 in step 502, the controller 401 executes the processing in step 503, in which "1" is set in the FLAG 1. The controller 401 then compares the value in the counter cnt with the set value N1. Because the value in the counter cnt is "1" and the set value N1 is "2" at this time, the controller 401 executes the processing in step 507, in which "1" is added to the value in the counter cnt, thereby the counter value cnt becomes "2". In step 510, the controller 401 outputs the carrier wave cycle command Fc as the second carrier wave frequency command Fc2. The reason why "1" is set in the FLAG 1 at time T702 is to prevent the counter cnt from being updated repetitively in the processing at time T703 (to be described later). In other words, the processing in step 507 is executed for the counter cnt only when the FLAG 1 is updated from "0" to "1". Consequently, the counter cnt can count the number of times for a case in which one of the line-to-line voltages takes its maximum value.

Next, a description will be made for the processing by the carrier wave compensator 401 at time T703 at which the carrier wave C takes its maximum value. When the determination result is 'true' in step 501, the controller 401 executes the processing in step 502. Because "1" is set in the FLAG 1 in step 502, the controller 401 executes the processing in step 508, in which "1" is set in the FLAG 1. Then, in step 511, the controller outputs a carrier wave cycle command Fc as the second carrier wave frequency command Fc2.

The processing by the carrier wave compensator 401 at time T704 at which the carrier wave C takes its maximum value is the same as that at time T701. At that time, "0" is set in the flat 1. The processings by the carrier wave compensator 401 at times T705 and T706 are also the same as that at time T701. Thus, the description will be omitted here.

Next, a description will be made for the processing by the carrier wave compensator 401 at time T707 at which the carrier wave C takes its maximum value. In step 501, since the line-to-line voltage Vvw approaches the maximum value, the determination result of step 501 becomes "Yes" and the controller 401 executes the processing in step 502. Because "0" is set in the FLAG 1 in step 502, the controller 401 executes the processing in step 503. In step 503, "1" is set in the FLAG 1. The controller 401 thus compares the value in the counter cnt with the set value N1 in step 504. At this time, because "2" is set in the counter cnt and "2" is set as the set value N1, the controller 401 executes the processing in step 505. In step 505, the controller 401 cleans the counter cnt to "0", then outputs the third carrier wave frequency command Fc3 as the second carrier wave frequency command Fc2. The frequency of the Fc3 is lower than that of the carrier wave cycle command Fc. Thereby, the frequency of the carrier wave C is lowered, in the other ward, the carrier wave with the career cycle longer than the preset carrier cycle is inserted. Consequently, the cycle of a carrier wave C becomes long, and the pulse width of the DC current Idc becomes wider, thereby the current detector 7 can detect the motor current.

At time T708 at which the carrier wave takes its maximum value, the controller 401 executes the same processing as that at time T701 to output the carrier wave cycle command Fc as the second carrier wave frequency command Fc2. Consequently, the frequency and the carrier cycle of the carrier wave C returns to those of the preset carrier wave.

Repeating the above processings, the counter cnt counts the number of times in which one of the line-to-line voltages takes its maximum value and the frequency of the carrier wave C is inserted the carrier wave command Fc with the long carrier cycle to the third carrier wave frequency command Fc3 every once at the set value of N1+1, thereby the pulse width of the DC current Idc is set wider to enable current detection. In this embodiment, because N1=2 is set, the carrier wave cycle command Fc is switched to the third carrier wave frequency command Fc3 around the maximum value of the line-to-line voltage where current detection is done easily once in three times.

According to this second embodiment, it is only required to reduce the magnetic noise that the frequency of the carrier wave C is lowered around the maximum value of the line-to-line voltage whose Idc pulse width is wider than other phases. This second embodiment is thus more effective than the first embodiment, since the third carrier wave frequency command Fc3 can be set higher. Although the processing in FIG. 8 is executed regardless of the size of the output voltage, the processing can also be executed when it can be confirmed that the output voltage is under the predetermined value. Consequently, when the output value is larger than the predetermined value, the carrier wave frequency can be kept at Fc. The controlling characteristics of the system can thus be prevented from degradation.

According to the present invention, therefore, it is possible to provide a method for suppressing magnetic noise and securing a sampling time enough to detect currents, as well as a power converter unit that employs the method.

What is claimed is:

1. A method for modulating a pulse width, comprising:
   converting electric power between a DC and an AC by a power converter;
   modulating the pulse width based on a modulated wave and a carrier wave and supplying gate signals to said power converter;
   detecting a current of the DC; and
   detecting each phase current of the AC based on the detected DC current and the gate signals;
   wherein the carrier cycle of the carrier wave, when the current is to be detected, is set longer than the carrier cycle to be set when no current is to be detected.

2. A method for modulating a pulse width, comprising:
   converting electric power between a DC and an AC by a power converter;
   modulating the pulse width based on a modulated wave and a carrier wave with a preset carrier cycle and supplying gate signals to said power converter;
   detecting a current of the DC; and
   detecting each phase current of the AC based on the detected DC current and the gate signals;
   characterized by inserting the carrier wave with a long carrier cycle longer than the preset carrier cycle periodically; and
   sampling the detected DC current during the long carrier cycle.

3. The method for modulating a pulse width according to claim 2,
   wherein the carrier wave with the long carrier cycle is inserted only one cycle.

4. The method for modulating a pulse width according to claim 2,
   wherein the carrier wave with the long carrier cycle is inserted when the AC voltage of said power converter is under a predetermined value.

5. The method for modulating a pulse width according to claim 2,
   wherein the carrier wave with the long carrier cycle is inserted every once at 1 millisecond or over.

6. A method for modulating a pulse width, comprising:
   converting electric power between a DC and an AC by a power converter;
   modulating the pulse width based on a modulated wave and a carrier wave with a preset carrier cycle and supplying gate signals to said power converter;
   detecting a current of the DC; and detecting each phase current of the AC based on the detected DC current and the gate signals;

characterized by inserting the carrier wave with a long carrier cycle of an integer multiple of the preset carrier cycle periodically; and sampling the current of the DC during the long carrier cycle.

7. A method for modulating a pulse width, comprising:

converting electric power between a DC and an AC by a power converter;

modulating the pulse width based on a modulated wave and a carrier wave with a preset carrier cycle and supplying gate signals to said power converter;

detecting a current of the DC; and detecting each phase current of the AC based on the detected DC current and the gate signals;

characterized by inserting the carrier wave with a long carrier cycle of an integer multiple of the preset carrier cycle around the maximum value of the line-to-line voltage of the AC; and sampling the current of the DC during the long carrier cycle.

8. The method for modulating a pulse width according to claim 7, wherein the carrier wave with the long carrier cycle is inserted within a range of $\pi/6$ radian around the maximum value of the line-to-line voltage.

9. A power converter apparatus, comprising:

a power converter for converting electric power between a DC and an AC;

a means for modulating a pulse width based on a modulated wave and a carrier wave with a preset carrier cycle and supplying gate signals to said power converter;

a means for detecting a current of the DC; and a means for detecting each phase current of the AC based on the detected DC current and the gate signals;

characterized by a means for inserting the carrier wave with a long carrier cycle longer than the preset carrier cycle periodically; and a means for sampling an output of the DC current detecting means.

10. The power converter apparatus according to claim 9, wherein said inserting means inserts only one cycle of the carrier wave with a long carrier cycle.

11. The power converter apparatus according to claim 9, wherein said inserting means inserts the carrier wave with a long carrier cycle when the AC voltage of said power converter is under a predetermined value.

12. The power converter apparatus according to claim 9, wherein said inserting means inserts the carrier wave with a long carrier cycle every once at 1 millisecond or over.

13. A power converter apparatus, comprising:

a power converter for converting electric power between a DC and an AC;

a means for modulating a pulse width based on a modulated wave and a carrier wave with a preset carrier cycle and supplying gate signals to said power converter;

a means for detecting a current of the DC; and a means for detecting each phase current of the AC based on the detected DC current and the gate signals;

characterized by a means for inserting the carrier wave with a long carrier cycle of an integer multiple of the preset carrier cycle periodically; and a means for sampling an output of the DC current detecting means.

14. A power converter apparatus, comprising:

a power converter for converting electric power between a DC and an AC;

a means for modulating a pulse width based on a modulated wave and a carrier wave with a preset carrier cycle and supplying gate signals to said power converter;

a means for detecting a current of the DC; and a means for detecting each phase current of the AC based on the detected DC current and the gate signals;

characterized by a means for inserting the carrier wave with a long carrier cycle of an integer multiple of the preset carrier cycle around the maximum value of the line-to-line voltage of the AC, and a means for sampling an output of the DC current detecting means.

15. The power converter apparatus according to claim 14, wherein said inserting means inserts the carrier wave with a long carrier cycle of an integer multiple of the preset carrier cycle within a range of $\pi/6$ radian around the maximum value of the line-to-line voltage.

16. An inverter apparatus, comprising:

an inverter for inverting electric power from a DC to a three-phase AC;

a means for generating an output frequency command for said inverter;

a means for modulating a pulse width based on a modulated wave depending on the output frequency command and a carrier wave with a preset carrier cycle and supplying gate signals to said inverter;

a means for detecting a current of the DC; and a means for detecting each phase current of the three-phase AC based on the detected DC current and the gate signals;

characterized by a means for inserting the carrier wave with a long carrier cycle longer than the preset carrier cycle; and a means for sampling an output of the DC current detecting means.

17. The inverter apparatus according to claim 16, further comprising:

means for generating a phase command based on the output frequency command; and means for enabling the inserting means at a time interval based on the phase command.

18. The inverter apparatus according to claim 16, further comprising:

means for determining insertion the carrier wave with the long carrier cycle based on periodical calculation.

19. The inverter apparatus according to claim 16, wherein the long carrier cycle is an integer multiple of the preset carrier cycle.

20. The inverter apparatus according to claim 16, wherein the inserting means inserts the carrier wave with a long carrier cycle at a crest of the carrier wave with the preset carrier cycle.

21. The inverter apparatus according to claim 16, wherein the inserting means inserts the carrier wave with a long carrier cycle around the maximum value of the line-to-line voltage of the three-phase AC.

22. The inverter apparatus according to claim 16, wherein said inserting means inserts the carrier wave with a long carrier cycle every once at 1 millisecond or over.

* * * * *